(12) United States Patent
Sanjeev (10) Patent No.: US 9,047,630 B2
(45) Date of Patent: Jun. 2, 2015

(54) USING A MOBILE DEVICE TO MAKE A TRANSACTION

(75) Inventor: Kumar Sanjeev, San Ramon, CA (US)

(73) Assignee: Cellco Partnership, Basking Ridge, NJ (US)

(*) Notice: Subject to any disclaimer, the term of this patent is extended or adjusted under 35 U.S.C. 154(b) by 452 days.

(21) Appl. No.: 12/905,734

(22) Filed: Oct. 15, 2010

(65) Prior Publication Data
US 2012/0095856 A1    Apr. 19, 2012

(51) Int. Cl.
| G06Q 30/02 | (2012.01) |
|---|---|
| G06Q 30/06 | (2012.01) |
| G06Q 20/08 | (2012.01) |
| G06Q 20/16 | (2012.01) |
| G06Q 20/20 | (2012.01) |
| G06Q 20/30 | (2012.01) |
| G06Q 20/32 | (2012.01) |

(52) U.S. Cl.
CPC .......... *G06Q 30/0603* (2013.01); *G06Q 20/325* (2013.01); *G06Q 20/30* (2013.01); *G06Q 20/305* (2013.01); *G06Q 20/32* (2013.01); *G06Q 20/3255* (2013.01); *G06Q 20/085* (2013.01); *G06Q 20/0855* (2013.01); *G06Q 20/16* (2013.01); *G06Q 20/08* (2013.01); *G06Q 20/204* (2013.01); *G06Q 30/02* (2013.01)

(58) Field of Classification Search
None
See application file for complete search history.

(56) References Cited

U.S. PATENT DOCUMENTS

| 6,047,270 | A  | * | 4/2000  | Joao et al. ................... 705/44 |
|---|---|---|---|---|
| 7,708,194 | B2 |   | 5/2010  | Vawter |
| 7,748,618 | B2 |   | 7/2010  | Vawter |
| 7,823,772 | B2 |   | 11/2010 | Vawter |
| 7,870,077 | B2 | * | 1/2011  | Woo et al. ................... 705/78 |
| 7,945,479 | B2 | * | 5/2011  | Asher et al. ................. 705/26.1 |
| 2006/0224508 | A1 |   | 10/2006 | Fietz |
| 2007/0107016 | A1 | * | 5/2007  | Angel et al. .................. 725/61 |
| 2007/0213991 | A1 | * | 9/2007  | Bramante ..................... 705/1 |
| 2008/0299970 | A1 |   | 12/2008 | Roberts |
| 2008/0319650 | A1 | * | 12/2008 | Aaltonen et al. ............. 701/207 |

(Continued)

FOREIGN PATENT DOCUMENTS

WO    WO 2009/094482    *    7/2009    ............. G06Q 30/00

OTHER PUBLICATIONS

The New York Times, "The new impulse: Buying using text messaging," Sep. 7, 2010. <http://www.nytimes.com/2007/04/16/technology/16iht-adco.1.5302950.html>.

(Continued)

*Primary Examiner* — Asfand Sheikh
*Assistant Examiner* — Allen Chein (57) ABSTRACT

An exemplary method enables a user of a mobile device to make purchases. From the mobile device, the user sends a messaging service short code identifying a retailer, an item identifier for an item offered for sale by a retailer and information indicating the user's intent to purchase the item to the retailer via a mobile network. The method also includes steps of receiving cost information for the item, from the system of the retailer; determining if the user has authorized transactions with the retailer through the network, and confirming the purchase of the item with the system of the retailer. Upon authorization, the cost information for the item is recorded to the subscriber's account, which enables processing of the cost information for inclusion on a bill to the user together with billing for mobile communication service provided by the network for the mobile device.

17 Claims, 3 Drawing Sheets

(56) References Cited

U.S. PATENT DOCUMENTS

2009/0292619 A1 11/2009 Kagan et al.
2010/0145861 A1 6/2010 Law et al.
2010/0153272 A1 6/2010 Wentker et al.
2010/0223145 A1 9/2010 Dragt

OTHER PUBLICATIONS

Extended European Search Report—dated Dec. 23, 2011 and issued in counterpart foreign application No. EPO 11008234.4, filed Oct. 15, 2011.

* cited by examiner

USING A MOBILE DEVICE TO MAKE A TRANSACTION

TECHNICAL FIELD

The present subject matter relates to techniques and equipment to allow mobile device users to utilize a mobile network messaging service, such as the short messaging service (SMS), to purchase an advertised commodity without the need to send credit or debit card information to the retailer, and charges for the purchase will appear on the subscriber's bill for mobile services.

BACKGROUND

Mobile devices such as mobile phones provide a subscriber of a mobile service provider (e.g., Verizon Wireless™) with means to communicate with others using voice, SMS and electronic mail services. Internet data service also allows subscribers the ability to browse and use web pages such as buying products from an online retailer using a credit card. For example, if a customer would like to purchase a product, the customer may open a web browser on the mobile device which has internet service, locate a retailer selling the product, locate the product on the retailer's website, and enter the customer's credit card information and shipping information.

In this scenario, the customer must have a mobile device with internet service, must locate an online retailer and the product on the online retailer's website, must possess a valid credit card, must enter a valid credit card number and must enter customer shipping information. This multi-step procedure may result in unsuccessful location of a product, invalid credit card, miss-entry of credit card information or miss-entry of the shipping address. Therefore, this approach may result in unsuccessful mobile device purchases and poor customer experience. The customer may also be concerned about providing personal information such as credit card information and address information to a web-site of uncertain security/validity over the internet.

Hence a need exists for simple and secure manner for mobile device users to make transactions. Furthermore, there is a need for a method that makes the process of purchasing using a mobile device easier for the customer by enabling the customer to make purchases without necessarily requiring all the steps of accessing a web browser, locating a product on a website, having a credit card, and entering a credit card number and shipping address.

SUMMARY

To improve over the art and address one or more of the needs outlined above, mobile messaging services messages are used to initiate a transaction and to enable accounting for the transaction via the user's mobile device service subscription account.

In one general aspect, the instant application describes a method for enabling a user of a mobile device to purchase a commodity. The method includes the steps of receiving a mobile network messaging service message from a user's mobile device through a mobile communication network. The received message includes: a messaging service short code identifying a retailer, an item identifier for a commodity offered for sale by the retailer, and information indicating the user's intent to purchase the item.

The method also includes steps of forwarding the item identifier to a system of the retailer that is responsive to the short code and receiving cost information for the commodity, from the system of the retailer. Additionally, the method includes checking, in storage of an operator of the network, an account record for mobile communication service provided by the network for the mobile device, to determine whether a network subscriber associated with the account has authorized transactions with the retailer through the network. Upon determining the network subscriber associated with the account has authorized transactions with the retailer through the network, the method includes the step of confirming the purchase of the commodity with the system of the retailer.

Furthermore, the method includes steps of recording the cost information for the commodity against the subscriber's account, in storage of the operator of the network responsive to the confirming step; and processing the cost information from storage for inclusion on a bill to the subscriber together with billing for mobile communication service provided by the network for the mobile device.

The above general concept may include one or more of the following features. For example, the method may further include steps of upon determining the network subscriber associated with the account has not authorized transactions with the retailer through the network, requesting the authorization from the user's mobile device via a messaging service short code. The method may further include the step of receiving the mobile network messaging service message in the form of a short message service (SMS) message.

An additional feature of the above general concept involves configuring a portion of the SMS message containing the information indicating the user's intent to purchase the item to be selected from group of keywords consisting of BUY, BILL, CHARGE and PURCHASE and transmitting a message, including address information for the subscriber, to the system of the retailer. In addition, the method may include the step of receiving a message from the system of the retailer verifying the commodity has been purchased. The method may further include receiving new commodity information, from the system of the retailer and forwarding the message from the system of the retailer verifying the commodity has been purchased through the network to the mobile device. The forwarding step may be in the form of a SMS message that is sent through the network to the mobile device.

In another general aspect, the instant application describes a method, which involves receiving a mobile network messaging service message from a user's mobile device through a mobile communication network. The received message includes a messaging service short code identifying a retailer, an item identifier for a commodity offered for sale by the retailer and information indicating the user's request for information regarding the commodity. Responsive to the short code, the item identifier and user's request for information regarding the commodity are forwarded to a system of the retailer; and the user requested information for the commodity is received from the system of the retailer and the information is sent to the user's mobile device.

Those skilled in the art will appreciate that the disclosure also may teach implementing any of the methods in one or more appropriately configured systems and or via appropriate programming embodied in a medium.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various technologies disclosed herein relate to a method for enabling a user of a mobile device to more easily obtain product information and/or may purchase a product by sending a SMS to a retailer. If purchased, the item may be charged to the user's wireless phone bill.

The teachings herein alleviate one or more of the above noted problems with using a mobile device to conduct transactions.

As a result, in one general aspect, the instant application describes a method for enabling a user of a mobile device to purchase a product. The method includes steps identifying a product with a set of identifiers associated with the seller of the product and the specific product; sending an SMS with the set of identifiers in order to purchase the product or receive more information about the product, such as price, availability and shipping times.

The method may also include steps of billing the purchase of the product to the user's phone bill, the phone service provider providing the retailer with the customers shipping address and the user providing a one-time confirmation that they would like to use SMS to buy products from the retailer.

The above general concept may include one or more of the following features. For example, the method may further include steps of purchasing, obtaining price and shipping costs of a product by including a keyword along with the set of identifiers; and requesting this information from the retailer via the mobile device as a part of the message. The set of identifiers may include the sort code corresponding to the particular retailer and this sort code would be entered as the recipient of the SMS. For example, the SMS may comprise "1234 476 BILL." The set of identifiers in this example is "1234 476" and the keyword is "BILL." The "1234" in the set of identifiers is the sort code corresponding to the retailer and would be entered as the recipient's number. The "476" may be entered in the body of the SMS and corresponds to the particular product or service as an item code. The "BILL" keyword may correspond to the particular action the user requests. Additional examples of keywords may be "PRICE", "SHIPPING COSTS", and "AVAILABILITY." The set of identifiers may also include another set of numbers corresponding, for example, to the color, size, quantity and style of the product.

Figure 1:
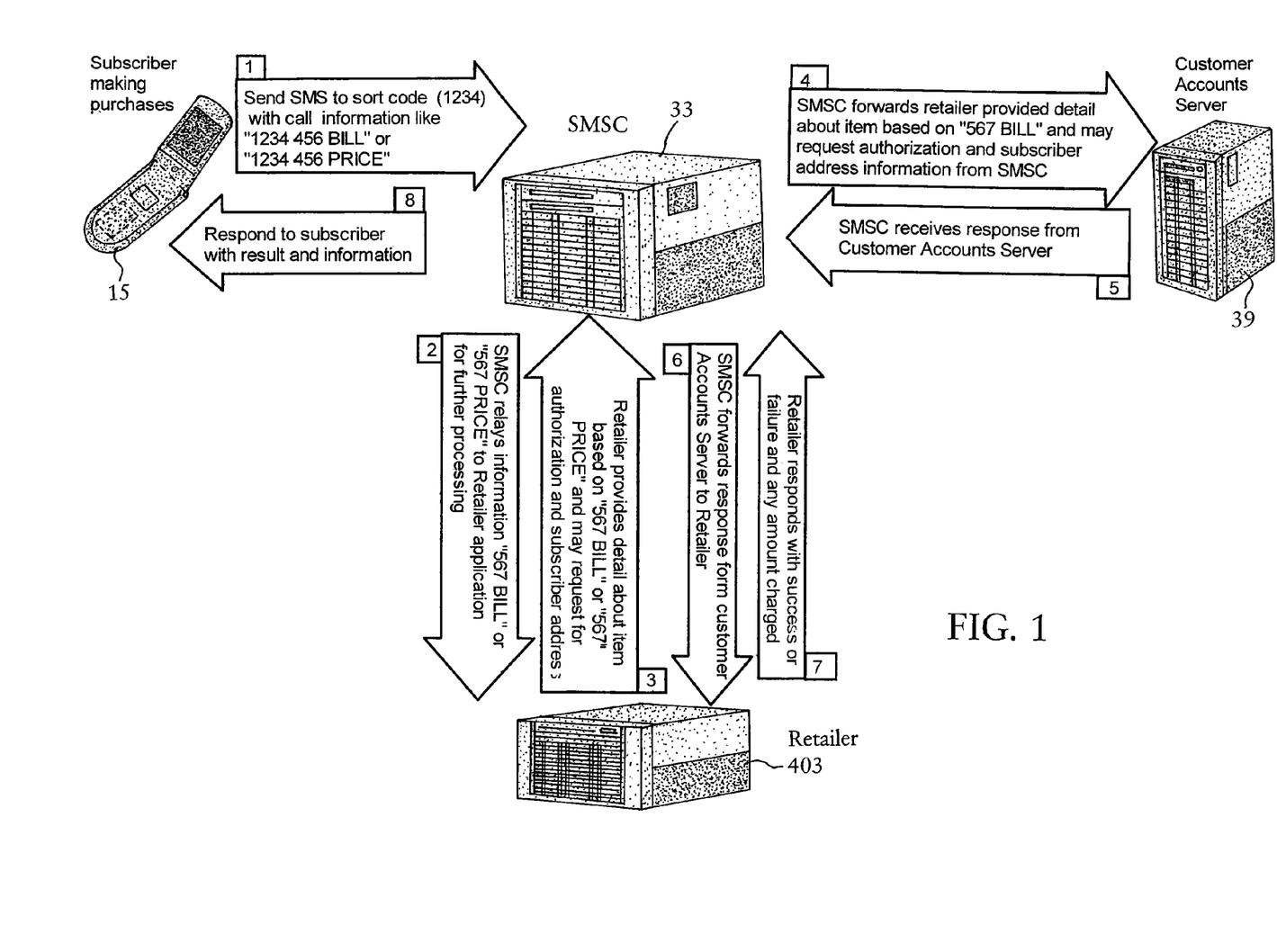
FIG. 1 illustrates an exemplary SMS purchase process to enable a mobile device user to purchase a product.

The method utilizes mobile network communication of messaging service messages to transport various messages regarding product information requests and purchase transactions. Examples of suitable mobile messaging services include short messaging service (SMS) enhanced messaging service (EMS) and multimedia messaging service (MMS). FIG. 1 illustrates an exemplary transaction made by a mobile device user using SMS.

For example, the user sees a print or television advertisement, hears an audio advertisement or sees a product with an associated short code and item number and decides he/she would like to purchase the product. At step 1, the user of the mobile device 15 sends an SMS message to the retailer associated with the short code in reference to the product and the keyword "BUY." The retailer's server checks to see if the product is available and if so, requests authorization and user shipping information from the SMSC 33. During this process, the retailer server 403 may access a product inventory server and pricing database (not shown).

In FIG. 1, the process begins with a mobile device user viewing an advertisement in which a short code and item number appears alongside the advertised product. The mobile device user decides that he/she would like to purchase the product and so sends an SMS message to the retailer. The user enters and submits an SMS message to the retailer including a sort code associated with the retailer, for example "1234", a product code, for example "476" and keyword, for example "BILL," indicating the user would like to purchase the product or "PRICE," The SMS is sent by the mobile device 15 to a Short Message Service Center ("SMSC") 33 (step 1) which relays the SMS message to the server 403 of the retailer (step 2). The server 403 of the retailer processes the SMS message received from the SMSC 33, provides information about the product according to the keyword and server 403 of the retailer may also request authorization and the user's address information from the SMSC 33 (step 3), if the user has requested to purchase the product.

The SMSC 33 in turn forwards the information provided and any user address information requested by the server 403 of the retailer to the Customer Accounts Server ("CAS") 39, (step 4). If the user has requested product information but has not requested to purchase the product, the SMSC 33 forwards the product information provided by the server of the retailer to the user's mobile device (step 8).

When CAS 39 receives the request from the SMSC, if the server 403 of the retailer has requested authorization, the CAS conducts basic validation on the user account. The validation process may include determining whether or not the user has previously authorized SMS to be used to make purchases from the particular retailer. If the user has not previously used SMS to make purchases from the retailer, (not opted in), the CAS 39 will initiate an SMS message request to the user via the SMSC 33, and user device 15 requesting authorization to opt in. If the user authorizes opting in by sending a return SMS message, the CAS 39 will send authorization to the SMSC 33 along with the user shipping information and any other information requested by the retailer server 403. If the user has previously opted in, the CAS 39 will automatically (without requesting authorization from the user) send authorization to the SMSC 33 along with the user shipping information and any other information requested by the server 403 of the retailer (step 5).

The SMSC 33 will in turn transmit the authorization and information provided by the CAS 39 to the retailer server 403 (step 6). Upon receipt of authorization and information from the CAS 39, the retailer server 403 will send an SMS message informing the user that the product has successfully been purchased and any tracking number and charges (step 7). The SMS message will be received by the SMSC 33 which forwards the result information to the mobile device 15 (step 8).

The cost information for the product is processed from storage and is included on a bill to the subscriber together with billing for mobile communications service provided by the network for the mobile device.

With this overview, a more detailed illustration of SMS transaction process and interaction among different servers of the mobile service provider network will be described below with respect to FIG. 2.

Figure 2:
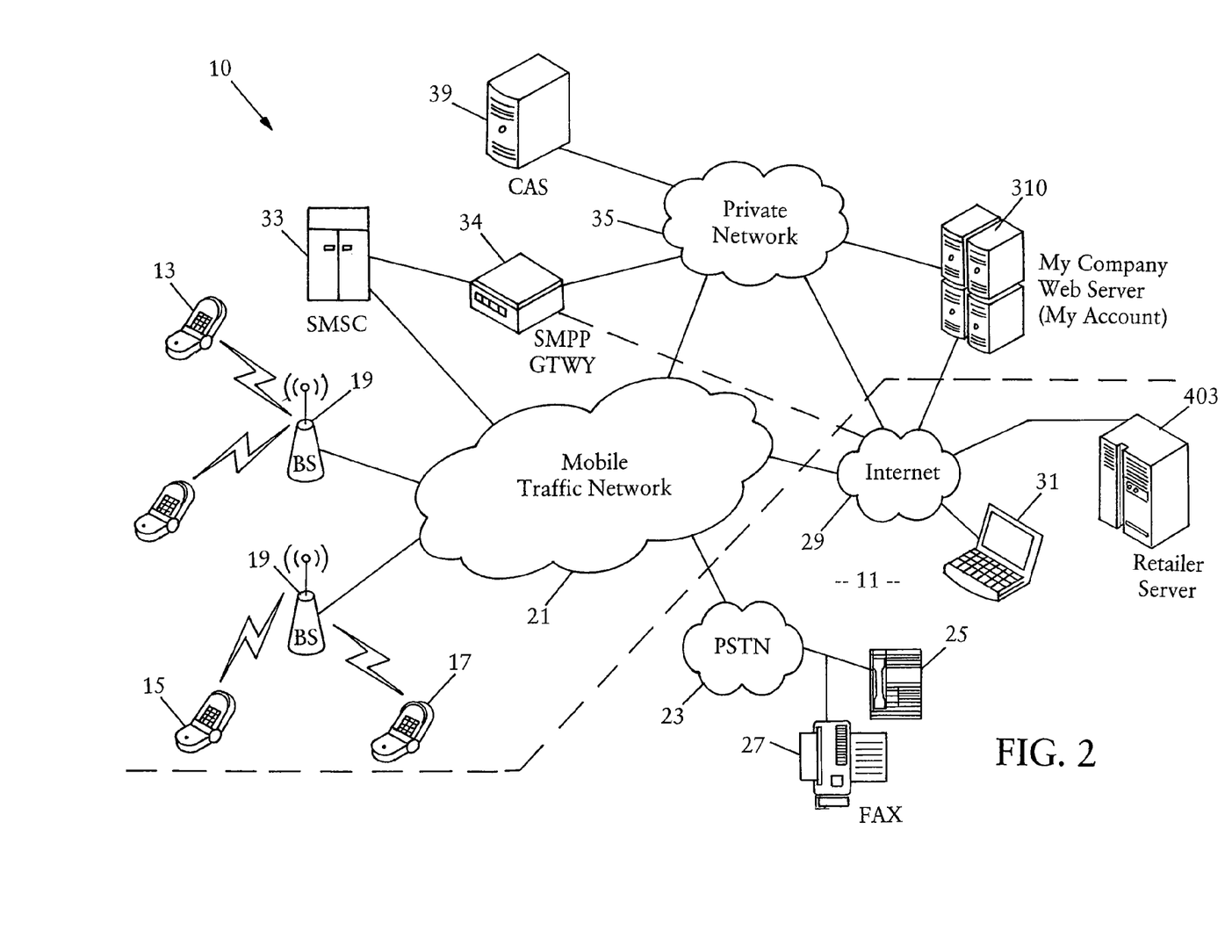
FIG. 2 illustrates a number of mobile devices, a mobile communication network coupled to other communication networks and several systems/elements associated with or included in the mobile network for various functions such as, for example, selling products to mobile devices.

FIG. 2 illustrates a number of mobile devices, a mobile communication network coupled to other communication networks and several systems/elements associated with or included in the mobile network for various functions such as, for example, using SMS to make purchases using a mobile devices.

FIG. 2 illustrates a mobile communication network 10 as may be operated by a carrier or service provider to provide a wide range of mobile communication services and ancillary services or features to its subscriber customers and associated mobile device users. The elements generally indicated by the reference numeral 10 generally are elements of the network and are operated by or on behalf of the carrier, although the mobile devices typically are sold to the carrier's customers. The mobile communication network 10 provides communications between mobile devices as well as communications for the mobile devices with networks and devices 11 outside the mobile communication network 10.

Several mobile devices 13, 15, 17 appear in the drawing, to represent examples of the mobile devices that may receive various services via the mobile communication network 10. Current examples of mobile devices include portable handsets, smart-phones or personal digital assistants, although they may be implemented in other form factors.

The network 10 allows users of the mobile devices to initiate and receive telephone calls to each other as well as through the public switched telephone network ("PSTN") 23 and telephone devices such as 25 and 27 connected thereto. The network 10 also allows SMS type text messaging between devices. The network 10 typically offers a variety of other data services via the Internet 29, such as downloads, web browsing, e-mail, etc. In one particular example, as noted above, the network 10 enables a user of mobile devices 13, 15, 17 to purchase products without necessarily having to use a web browser or enter a credit number or shipping address for every transaction.

The mobile communication network 10 typically is implemented by a number of interconnected networks. Hence, the overall network 10 may include a number of radio access networks ("RANs"), as well as regional ground networks interconnecting a number of RANs and a wide area network ("WAN") interconnecting the regional ground networks to core network elements, such as the SMSC 33. The SMSC 33 transmits text messages for display on the mobile devices. The SMS traffic uses the signaling portion of the network 21 to carry message traffic between a SMSC 33 and the mobile devices 13, 15 and 17. The SMSC 33 supports mobile device to mobile device delivery of text messages. However, the SMSC also supports communication of messages between the mobile devices and devices coupled to other networks. For example, the SMSC 33 may receive incoming IP message packets from the Internet 29 for delivery via the network 21, one of the base stations 19 and a signaling channel over the air to link to a destination mobile device. For this later type of SMS related communications, the network 10 also includes one or more Short Message Peer-to-Peer ("SMPP") protocol gateways 34. The SMPP gateway provides protocol conversions, between SMPP as used by the SMSC 33 and the protocols used on the Internet 29 or other IP network. SMPP messages ride on IP transport, e.g. between the gateway 34 and the SMSC 33.

A regional portion of the network 10, such as that serving mobile devices 13, 15 and 17, will typically include one or more RANs and a regional circuit and/or packet switched network and associated signaling network facilities.

Physical elements of a RAN operated by one of the mobile service providers or carriers include a number of base stations represented in the example by the base stations ("BS") 19. Although not separately shown, such a base station 19 typically comprises a base transceiver system ("BTS") which communicates via an antennae system at the site of base station and over the air and link with one or more of the mobile devices 13, 15 and 17, when the mobile devices are within range. Each base station typically includes a BTS coupled to several antennae mounted on a radio tower within a coverage area often referred to as a "cell." The BTS is the part of the radio network that sends and receives RF signals to/from the mobile devices that the base station currently serves.

The radio access networks also include a traffic network represented generally by the cloud at 21, which carries the user communications for the mobile devices 13, 15 and 17 between the base stations and other elements with or through which the mobile devices communicate. Individual elements such as switches and/or routers forming the traffic network 21 are omitted here form simplicity.

The identifier associated with the mobile device includes a Mobile Directory Number ("MDN") associated with the mobile device. The MDN is the telephone number assigned to a mobile device, which a calling party or device inputs in order to call or send a message to the particular mobile device. To call the mobile device 15, for example, a user of a PSTN telephone 25 or of another mobile 13 device dials the MDN associated with the mobile device 15. To send a Multimedia message (MMS) message or a SMS message to destination mobile device 15, as another example, typically entails input of the MDN of that mobile device. A Mobile Identification Number ("MIN") is an identification number used by the network 10 to signal a particular mobile device. The MIN is formatted like a telephone number, and the MIN may be the same as the MDN. However, the network may assign a different number for use as the MIN and translate the MDN input by a calling or other originating party into the MIN that the network 10 uses to establish the call or send the message to the destination mobile device. Of these numbers assigned to the mobile device, the MDN may be the number or address of the device known and used by other parties or devices.

The traffic network portion 21 of the mobile communication network 10 connects to a public switched telephone network ("PTSN") 23. This allows the network 10 to provide voice grade call connections between mobile devices and regular telephones connected to the PSTN 23. The drawing shows one such telephone at 25. For purposes of discussing notifications, some notifications such as confirmation that the product has been purchased or shipped may entail voice message delivery or even service representative calls to the account holder, for example, at a regular telephone such as telephone 25 via the PSTN 23. The PSTN 23 also provides connections to other types of customer premises equipment, such as facsimile or 'FAX' machines. FIG. 2 shows one FAX machine 27, by way of example, to illustrate the point that an account holder notification such as confirmation that the product has been shipped may entail a facsimile transmission of the notification of shipping to the user's FAX machine, such as the machine 27.

The traffic network portion 21 of the mobile communication network 10 connects to a public packet switched data communication network, such as the network commonly referred to as the "Internet" shown at 29. Packet switched communications via the traffic network 21 and the Internet 29 may support a variety of user services through the network 10, such as mobile device communications of text and multimedia messages, e-mail, web surfing or browsing, programming and media downloading, etc. For example, the mobile devices may be able to receive messages from and send messages to user terminal devices, such as personal computers, either directly (peer-to-peer) or via various servers (not separately shown). FIG. 1 shows one such user terminal device as a personal computer ("PC") at 31, by way of example. For purposes of discussing notifications, some notifications such as notification confirming that the product has been successfully purchased may entail an e-mail message transmission of the notification to the user's terminal, such as to the PC 29 via the Internet 29.

Of note, in addition to the user viewing a retailer's advertisement in a print or television advertisement or hearing an advertisement on the radio, a retailer server 403 may send a direct SMS, EMS, MMS or email to a mobile device 17 advertising a product. The mobile device 17 user views the SMS, EMS, MMS or email message sent by the retailer and decides to buy the product by sending an SMS to the retailer. Alternatively or in addition, the user may seek more information about the advertised product, such as the price and availability. In this scenario, the user sends an SMS to the retailer with the product code and a keyword descriptive of the information requested, for example keyword "PRICE." The network 10 will send the SMS to the retailer, which in turn will process the request or action, after gaining authorization and any requested customer information from the CAS 39 and send the information or confirmation to the user via the SMSC 33, the traffic network 21, one of the base stations 19.

The complete SMS transaction may be accomplished as a result of collaboration of several ancillary support elements associated with the network 10. These support elements communicate with other nodes/elements of the network 10 via one or more private IP type packet data networks 35 (sometimes referred to as an Intranet).

Other network support elements, for example, include one or more systems of record, such as the system shown at 39 which is a Customer Accounts Server (CAS). An example of such a system 39 is a Vision system, which includes customer/subscriber account records. A large carrier typically has a number of such systems, and the system that stores the account data for a particular subscriber may be referred to as the "Customer Accounts Server" for that subscriber's account.

In practice today, the carrier will also offer its subscribers on-line access to a variety of functions related to the subscribers' accounts, such as review of billing statements and usage data, on-line payment, subscription changes, password control or the like. For that purpose, the carrier in this example operates a customer account web server 310, offering a 'MyAccount' (Now MyVerizon) type subscriber interface via the Internet. Hence, a user's terminal, such as PC 31, may be used to access on-line information about a subscriber's account, such as bill information which the mobile carrier makes available via the carrier's MyAccount web site accessible through the Internet 29. The user may be able to review purchases made using the mobile device and keep track of information sent by retailers.

In reference to FIG. 2, the system 10 enables a user of a mobile device 15 to obtain information and/or purchase a commodity. The method includes the steps of sending a mobile network messaging service message, such as an SMS message, from a user's mobile device 15 through a mobile communication network via a network messaging server, such as a SMSC 33 (step 1). The message includes: a messaging service short code identifying a retailer, an item identifier for a commodity offered for sale by the retailer, and information indicating the user's intent to purchase the item.

The SMSC type server 33 forwards the item identifier to a system of the retailer 403 that is responsive to the short code (step 2), and the SMSC 33 receives cost information for the commodity, and a request for the user's shipping address from the system of the retailer 403 (step 3). Additionally, the method includes steps of forwarding the retailer 403 provided cost information and request for user shipping information to an operator of the network, such as the customer accounts server (CAS) 39, which maintains an account record for mobile communication service provided by the network for the mobile device (step 4). In addition, the method includes the steps of checking, in storage of the operator of the network, the account record for mobile communication service provided by the network for the mobile device 15, to determine whether a network subscriber associated with the account has authorized transactions with the retailer through the network.

Upon determining the network subscriber associated with the account has authorized transactions with the retailer 403 through the network, the method includes the step of confirming the purchase of the commodity with the system of the retailer 403, via the SMSC 33 (steps 5 and 6). The system 403 of the retailer provides confirmation of the purchase to the mobile device 15 of the network subscriber associated with the account via the server 33 (steps 7 and 8).

Furthermore, the method includes steps of recording the cost information for the commodity against the subscriber's account, in storage of the operator of the network, such as the CAS 3,9 responsive to the confirming step; and processing the cost information from storage for inclusion on a bill to the subscriber together with billing for mobile communication service provided by the network for the mobile device.

Figures 3, 4:
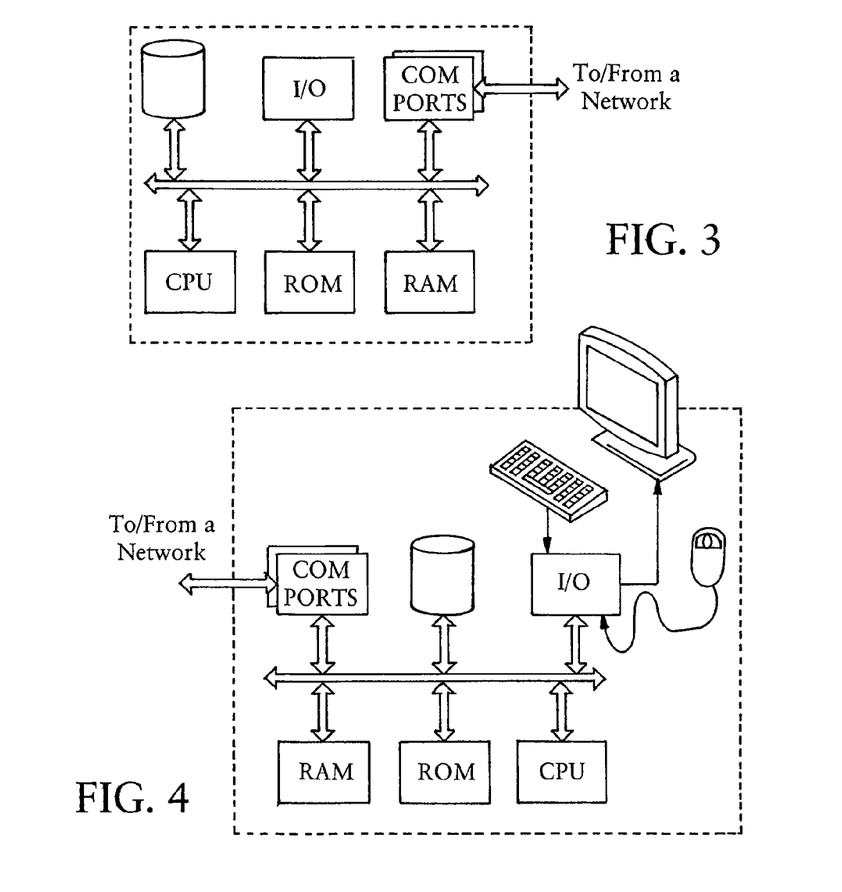
FIG. 3 is a simplified functional block diagram of a computer that may be configured as a host or server, for example, to function as the Customer Accounts Server in the system of FIG. 2.
FIG. 4 is a simplified functional block diagram of a personal computer or other work station or terminal device.

As shown by the above discussion, functions relating to techniques and equipment to allow mobile device users to utilize a mobile network messaging service, such as SMS, to purchase an advertised commodity may be implemented on one or more computers connected for data communication via the a mobile network, operating as a SMSC or the like. FIGS. 3 and 4 provide functional block diagram illustrations of general purpose computer hardware platforms. FIG. 3 illustrates a network or host computer platform, as may typically be used to implement a server or SMSC. FIG. 4 depicts a computer with user interface elements, as may be used to implement a personal computer or other type of work station or terminal device, although the computer of FIG. 4 may also act as a server if appropriately programmed. It is believed that those skilled in the art are familiar with the structure, programming and general operation of such computer equipment and as a result the drawings should be self-explanatory.

A platform for a server or the like, for example, includes a data communication interface for packet data communication. The platform also includes a central processing unit (CPU), in the form of one or more processors, for executing program instructions. The platform typically includes an internal communication bus, program storage and data storage for various data files to be processed and/or communicated by the platform, although the server often receives programming and data via network communications. The hardware elements, operating systems and programming languages of such equipment are conventional in nature, and it is presumed that those skilled in the art are adequately familiar therewith. Of course, SMSC and/or other server functions may be implemented in a distributed fashion on a number of similar platforms, to distribute the processing load.

Hence, aspects of the methods of enabling a mobile device user to conduct transaction via a mobile network messaging service may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the to automatically providing directions on a mobile station of a customer at a first store to the location of a second store that has a desired product not available in the first store as shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method, comprising steps of:

receiving, by a message service center of a mobile communication service provider, a mobile network messaging service message from a system of a retailer, wherein the mobile network messaging service message contains an advertisement for an item;

delivering the retailer message from the message service center through a mobile communication network to a user's mobile device;

in response to the delivered retailer message, receiving, by the message service center of the mobile communication service provider, a mobile network messaging service message from the user's mobile device through the mobile communication network, the received user's mobile device message including a messaging service short code having a retailer identifier of the retailer, an item identifier for an item offered for sale in the advertisement by the retailer, and information indicating the user's intent to purchase the item;

responsive to the short code, forwarding by the message service center, the item identifier in the short code to the system of the retailer identified by the retailer identifier using the mobile communication network;

receiving, at the message service center of the mobile communication service provider, a message from the retailer indicating that the item is available from the retailer, the message including a request to authorize the purchase and to provide shipping information;

in response to the request from the retailer for authorization and shipping information, checking, via a customer accounts server of the mobile communication service provider, an account record for mobile communication service provided by the mobile communication service provider for the mobile device, to determine whether a network subscriber associated with the account record has previously authorized transactions with the retailer via mobile network messaging service messages through the mobile communication network, wherein the previous authorization of transactions via mobile network messaging service messages through the mobile communication network occurs prior to the step of receiving the mobile network messaging service message from the user's mobile device indicating the users intent to purchase the item;

upon determining by the message service center, via the checking of the account record, the network subscriber associated with the account record has previously authorized using mobile network messaging service messages for transactions with the retailer through the mobile communication network, confirming the purchase of the item by forwarding a confirmation message from the customer accounts server to the system of the retailer, by the message service center using the mobile communication network, wherein the confirmation message includes authorization for the retailer to complete a purchase of the item from the retailer and shipping address information of the subscriber based on information obtained from the account record;

responsive to confirming the purchase, recording cost information for the item against the subscriber's account; and processing the cost information from the customer accounts server for inclusion on a bill to the subscriber together with billing for the mobile communication service provided by the mobile communication service provider for the mobile device.

2. The method of claim 1, wherein the received user's mobile device message is a short message service (SMS) message.

3. The method of claim 2, wherein the information in the SMS message indicating the user's intent to purchase the item is selected from a group of keywords consisting of BUY, BILL, CHARGE and PURCHASE.

4. The method of claim 1, wherein the step of confirming the purchase with the system of the retailer comprises:
receiving a message from the system of the retailer verifying the item has been purchased.

5. The method of claim 4, further comprising a step of forwarding the message from the system of the retailer verifying the item has been purchased through the mobile communication network to the user's mobile device.

6. The method of claim 5, wherein the step of forwarding the message from the system of the retailer comprises sending the message verifying the item has been purchased as a SMS message through the mobile communication network to the user's mobile device.

7. The method of claim 1, further comprising the step of, prior to confirming the purchase of the item, receiving new item information, from the system of the retailer.

8. An article comprising a non-transitory medium and programming embodied in the medium for configuring one or more programmable systems to:
receive, by a message service center of a mobile communication service provider, a mobile network messaging service message from a system of a retailer, wherein the mobile network messaging service message contains an advertisement for an item;
deliver the retailer message from the message service center through a mobile communication network to a user's mobile device;
receive, in response to the delivered retailer message by the message service center of the mobile communication service provider, a mobile network messaging service message from the user's mobile device through the mobile communication network, the received user's mobile device message including a messaging service short code having a retailer identifier, an item identifier for an item offered for sale in the advertisement by the retailer, and information indicating the user's intent to purchase the item;
forward, by the message service center, the item identifier in the short code to a system of the retailer identified by the retailer identifier responsive to the short code using the mobile communication network;
receive, by the message service center, a message from the retailer indicating that the item is available from the retailer, the message including a request to authorize the purchase and to provide shipping information
check, in response to the request from the retailer for authorization and shipping information, via a customer accounts server of the mobile communication service provider, an account record for mobile communication service provided by the mobile communication network for the mobile device, to determine whether a network subscriber associated with the account record has previously authorized transactions with the retailer via mobile network messaging service messages through the mobile communication network wherein the previous authorization of transactions via mobile network messaging service messages through the mobile communication network occurs prior to receiving the mobile network messaging service message from the user's mobile device indicating the users intent to purchase the item;
confirm the purchase of the item by forwarding a confirmation message from the customer accounts server to the system of the retailer upon determining by the message service center via the checking of the account record of the network subscriber that the network subscriber associated with the account record has previously authorized using mobile network messaging service messages for transactions with the retailer via a mobile network messaging service message through the mobile communication network, wherein the confirmation message includes authorization for the retailer to complete a purchase of the item from the retailer and shipping address information of the subscriber based on information obtained from the account record;
responsive to confirming the purchase, record cost information for the item against the subscriber's account in response to the purchase confirmation; and
process the cost information from the customer accounts server for inclusion on a bill to the subscriber together with billing for the mobile communication service provided by the mobile communication provider for the mobile device.

9. The article of claim 8, wherein the received user's mobile device message is a short message service (SMS) message.

10. The article of claim 9, wherein the programming further configures the one or more programmable systems to, after confirming the purchase of the item:
receive a message from the system of the retailer verifying the item has been purchased.

11. The article of claim 10, wherein the programming further configures the one or more programmable systems to:
forward the message from the system of the retailer verifying the item has been purchased through the mobile communication network to the user's mobile device.

12. The article of claim 11, wherein the programming further configures the one or more programmable systems to:
send the message verifying the item has been purchased as a SMS message through the mobile communication network to the user's mobile device.

13. The article of claim 8, wherein the programming further configures the one or more programmable systems to receive, prior to confirming the purchase of the item, new item information, from the system of the retailer.

14. A system for enabling purchase of an advertised item, comprising:
a mobile network messaging service center, in a mobile communication network, configured to:

receive a mobile network messaging service message from a system of a retailer, wherein the mobile network messaging service message contains an advertisement for an item;

deliver the retailer message through the mobile communication network to a user's mobile device;

receive, in response to the delivered retailer mobile message, a mobile network messaging service message from the user's mobile device through the mobile communication network, the received user's mobile device message including a messaging service short code having a retailer identifier, an item identifier for the item offered for sale in the advertisement by the identified retailer, and information indicating the user's intent to purchase the item, responsive to the short code, forward the item identifier in the short code to a system of the retailer identified by the retail identifier, and receive an authorization request from the system of the retailer, the authorization request indicating that the item is available from the retailer, and including a request to authorize the purchase and to provide shipping information; and forward a confirmation message to the retailer confirming an authorization for the purchase of the item with the system of the retailer; and a server, in communication with the mobile network messaging service center, maintaining account records for subscribers to services provided through the mobile communication network, the server being configured to:

based on the authorization request received by the mobile network messaging service center, check an account record for mobile communication service provided by the mobile communication network for the mobile device, to determine whether a network subscriber associated with the account has previously authorized transactions with the retailer via mobile network messaging service messages through the mobile communication network, wherein the previous authorization of transactions via mobile network messaging service messages through the mobile communication network occurs prior to receiving the mobile network messaging service message from the user's mobile device indicating the users intent to purchase the item;

upon determining via the checking of the mobile communication service provider account record the network subscriber associated with the account record has previously authorized using mobile network messaging service messages for transactions with the retailer through the mobile communication network, send a confirmation message authorizing a purchase of the item identified by the item identifier to the messaging service center, wherein the confirmation message includes authorization for the retailer to complete a purchase of the item and shipping address information of the subscriber based on information obtained from the account record; and upon confirmation of the purchase, record the cost information for the item against the subscriber's account, for inclusion of the cost on a bill to the subscriber together with billing for the mobile communication service provided by the mobile communication network for the mobile device.

15. The system of claim 14, wherein the mobile network messaging service center is a short messaging service center (SMSC).

16. The system of claim 14, wherein the information in the message indicating the user's intent to purchase the item is selected from a group of keywords consisting of BUY, BILL, CHARGE and PURCHASE.

17. The system of claim 14, wherein the server is configured to, forward the message from the system of the retailer verifying the item has been purchased through the network to the mobile device.

* * * * *